UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

VAT DYE AND PROCESS OF MAKING SAME.

970,878.     Specification of Letters Patent.     Patented Sept. 20, 1910.

No Drawing.     Application filed June 9, 1910. Serial No. 565,840.

*To all whom it may concern:*

Be it known that I, RENÉ BOHN, a citizen of the Swiss Republic, residing at Mannheim, Germany, have invented new and useful Improvements in Vat Dyes and Processes of Making Same, of which the following is a specification.

The specification of Letters Patent No. 948,204 describes the production of a monosulfonic acid of indanthrene by treating indanthrene blue with mild sulfonating agents, preferably in the presence of boric acid. I have found that on treating this indanthrene monosulfonic acid so as to split off the sulfonic acid group, the original indanthrene blue is not obtained again, but a vat coloring matter is produced which dyes vegetable fiber shades of blue which are greener than those obtained from the indanthrene blue originally taken for the production of the monosulfonic acid. I have further found that, in order to produce the new coloring matter, it is not necessary first to prepare and isolate the sulfonic acid, as the said new coloring matter can also be obtained by heating indanthrene blue with sulfuric acid containing a small proportion of water, for instance with from 92 to 95 per cent. sulfuric acid, say, at a temperature of about 120° C. The heating is preferably carried out in the presence of boric acid, and should in any case be so conducted that the final product contains no considerable quantity of indanthrene sulfonic acid.

The following are examples of how my invention can be carried into practical effect, but the invention is not confined to these examples. The parts are by weight.

Example 1: Heat together, for six hours, at a temperature of one hundred degrees centigrade, ten parts of indanthrene blue, four parts of anhydrous boric acid, and two hundred parts of ninety-five per cent. sulfuric acid. Then pour the reaction liquid into water and filter off and wash the coloring matter.

Example 2: Heat together, at one hundred and twenty degrees centigrade, while continually stirring, one hundred parts of sulfuric acid (ninety-two to ninety-four per cent.) and five parts of indanthrene monosulfonic acid which has been obtained by treating indanthrene blue with a mild sulfonating agent in the presence of boric acid. When it is found, from a test portion, that the coloring matter is insoluble in boiling water (which is the case after about six hours), pour the solution into water and filter off and wash the coloring matter which separates out.

The new coloring matter, when dry, is a blue powder which is insoluble in water, alcohol, and dilute acids and alkalies. It differs from indanthrene blue in being somewhat soluble in glacial acetic acid and in dichlor-benzene, the solutions being blue. It is easily soluble in nitrobenzene and quinolin, the solutions being greenish blue. The new coloring matter yields a vat more readily than does indanthrene blue, and can also be dyed from a cold vat when making use of only small quantities of caustic soda.

Now what I claim is:—

1. The process of producing vat coloring matter by heating indanthrene monosulfonic acid with sulfuric acid containing a small proportion of water so as to split off the sulfonic acid group.

2. The process of producing vat coloring matter by heating indanthrene monosulfonic acid with sulfuric acid containing a small proportion of water and also boric acid.

3. The process of producing vat coloring matter by heating indanthrene blue with sulfuric acid containing a small proportion of water, the heating being carried out so that the final product contains no considerable trace of indanthrene sulfonic acid.

4. The process of producing vat coloring matter by heating indanthrene blue with sulfuric acid containing a small proportion of water and also some boric acid, the heating being carried out so that the final product contains no considerable trace of indanthrene sulfonic acid.

5. The process of producing vat coloring matter by heating indanthrene blue with from ninety-two to ninety-five per cent. sulfuric acid at a temperature of about one hundred and twenty degrees centigrade.

6. As a new article of manufacture the vat coloring matter which can be obtained by heating indanthrene blue with sulfuric acid containing a small proportion of water, which new vat coloring matter is insoluble in water, in alcohol, and in dilute acids and alkalies, somewhat soluble in glacial acetic acid and in dichlor-benzene yielding blue solutions, easily soluble in nitrobenzene and in quinolin the solutions being greenish blue, and is capable of dyeing vegetable fiber from a vat greener shades of blue than does the original indanthrene blue.

In testimony whereof I have hereunto set my hand in the presence of two subscribing witnesses.

RENÉ BOHN.

Witnesses:
 ERNEST L. IVES.
 W. N. SCHMIDT.